Figure 1:
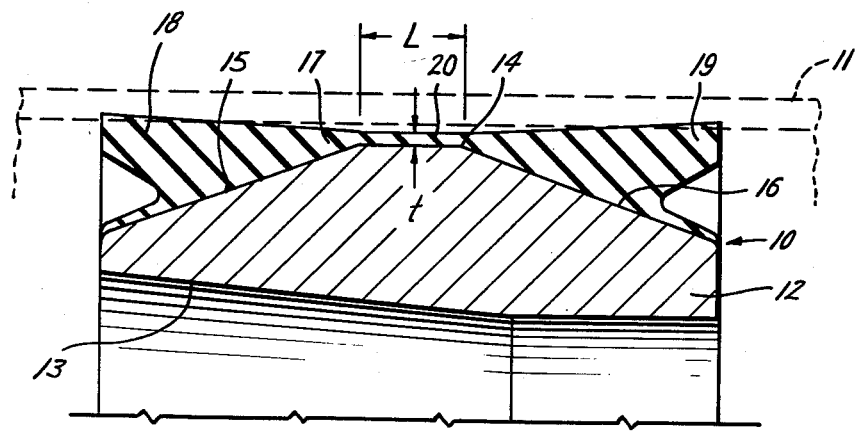

March 9, 1965  W. R. GARRETT  3,172,341
EXPANSIBLE CHAMBER

Filed June 14, 1963  3 Sheets-Sheet 1

William R. Garrett
INVENTOR.

BY Murray Robinson
ATTORNEY

William R. Garrett
INVENTOR.

BY Murray Robinson

ATTORNEY

March 9, 1965  W. R. GARRETT  3,172,341
EXPANSIBLE CHAMBER
Filed June 14, 1963  3 Sheets-Sheet 3

William R. Garrett
INVENTOR.

BY Murray Robinson
ATTORNEY

United States Patent Office 3,172,341
Patented Mar. 9, 1965

3,172,341
EXPANSIBLE CHAMBER
William R. Garrett, Midland, Tex., assignor to Drilco Oil Tools, Inc., Midland, Tex., a corporation of Texas
Filed June 14, 1963, Ser. No. 288,034
8 Claims. (Cl. 92—243)

This invention pertains to expansible chambers and more particularly to pistons and cylinders used in high pressure pumps for handling the drilling fluids used in earth boring operations, especially the mud or slush used in drilling wells for oil wherein the fluid is usually of a highly abrasive nature due to its content of sand and rock cuttings. Pressure differentials of 3000 p.s.i. are commonly encountered in circulating drilling mud.

A type of construction for the aforementioned use which has achieved a considerable degree of commericial success includes a cylinder having a removable replaceable liner and a piston which includes a tubular metal body that can be telescoped over and secured at the end of a piston rod and having a radial center flange of approximately the same outer diameter as the inner diameter of the pump cylinder liner. Replaceable annular lip seals are mounted on the body at each side of the flange which serves as a back-up for the seal rings. The lip seals make an interference fit with the liner and the back-up flange makes a clearance fit with the liner.

One type of failure encountered with expansible chambers using pistons of the aforementioned type consists of destruction of the liner at areas opposite the back-up flange in the dwell positions of the piston at the ends of its stroke. Another type of failure consists of the formation of longitudinal grooves in the liner. As soon as the liner becomes rough there will be leakage and the seal rings themselves are rapidly destroyed.

It has heretofore been proposed to improve the foregoing type of construction by connecting the two seal rings with a band of rubber around the outer periphery of the back-up flange, thereby preventing any possibility of metal to metal contact between flange and liner. In such construction the integral seal must be at least partially molded and vulcanized in place since the back-up flange prevents the seal rings from being mounted on the metal body subsequent to their formation. Pistons of this type, which may be called covered flange pistons, have been used in low pressure applications where there is less tendency for failure in the area of the unbacked-up rubber band around the flange.

Another type of failure of the piston construction first described consists of early deterioration of the seal rings requiring too frequent replacement thereof. A piston intended to overcome this type of failure is provided with long seal rings that are hollowed out practically their entire length so that they are in effect all lip. This construction provides little or no central area to the seal ring which could be releasably clamped in place as in the first described type of piston and instead the ends of the tubular seal rings are bonded to the metal body. A series of tongues and groove are provided at the rubber metal joint to interlock same and a full liner diameter back-up flange is provided between the two seal rings to support the tubular ends thereof. It will be appreciated that this construction leaves unsolved the problem of liner destruction due to metal to metal contact with the back-up flange.

It is an object of the present invention to provide a slush pump piston and liner construction suitable for high pressure use which effectively and markedly improves the life of both the seal ring and liner. The new construction involves the principle that if the cause of wear on the seal rings is eliminated or reduced, neither oversized lips nor replaceable seal rings will be necessary.

The object of the invention is accomplished in part by preventing destruction of the liner surface by eliminating metal to metal contact. However instead of merely providing a rubber band around the back-up flange of the old replaceable seal ring construction a new flangeless fusiform body shape is provided which when the seal rings are united thereto prevents rubber blow out past the waist or maximum diameter portion of the metal body and prevents destructive pressure concentrations in the lips of the seal rings.

For a detailed description of a preferred embodiment of the invention and a number of modifications thereof, reference will now be made to the accompanying drawings wherein FIGURES 1 through 6 are fragmentary axial sections through half of the inner member of a piston as it appears in the relaxed condition, the cooperating liner being indicated in dotted lines.

Referring now to FIGURE 1 there is shown a piston 10 and liner 11. The piston includes a generally tubular body 12 having a tapered portion 13 inside one end adapted to be placed on the tapered end of a piston rod.

The exterior of the body 12 is of fusiform shape, including a central or waist portion 14 of maximum diameter and tapered end portions 15, 16. The taper angle of the end portions is preferably in the range of 5 to 45 degrees. To the outer periphery of body 12 there is secured a seal sleeve 17 including two annular lip portions 18, 19 and a central band 20 around the waist of the body. The waist band is preferably about three thirty-seconds of an inch thick. A range from one thirty-second of an inch to three-eighths of an inch is suitable.

The sleeve is preferably made of an oil resistant synthetic rubber although other elastomers may be used, and preferably has a Shore durometer (type A) hardness in the range of 60–95.

The seal sleeve 17 is secured to the body 12 by a process which may be termed unitization. The outer peripheral surface of the body is first thoroughly cleaned, as by sand blasting or with etching acid or alkalies. A thin coat of rubber cement is then applied to the body and it is put in a mold. The mold is filled with uncured rubber and then heated to effect vulcanization in situ. During the heating of the rubber while in the mold and the consequent vulcanization reaction, pressures of the order of ten thousand p.s.i. (range of 5000 to 20000 p.s.i.) will be created, with temperatures several hundred degrees F. (range of about 275 to 325 degrees F.) so that the rubber flows into intimate engagement with the metal surface. After the vulcanization the rubber is allowed to cure for an hour or so. The result is a perfect unitization of the rubber and meal as is essential for achieving the full results of the invention.

As shown, the outer diameter of the waist band of the seal sleeve has an outer diameter slightly smaller than the inner diameter of the liner, e.g. 0.002 to 0.010 inch radial clearance when new. The lips 18, 19 of the seal sleeve flare to a relaxed outer diameter larger than the inner diameter of the liner, e.g., with a radial interference of 0.035 to 0.100 inch when new. As shown in the drawings, the flare of the seal sleeve extends all the way from the tip ends of the lips to the waist band 20, the fit changing gradually from a maximum interference at the ends of the lips to a slight clearance at the waist line.

FIGURES 2 through 6 show modifications similar to FIGURE 1 except that instead of a single taper at each end of the metal body, a plurality of tapers are used. These will be useful in the case of pumps having smaller diameter piston rods or larger diameter liners than shown in FIGURE 1. In such case there is more volume to be occupied by the piston and to avoid having too heavy a piston, the metal body is cut down at a greater taper angle at the portions midway between waist and ends, forming tubular necks at the ends of the metal body.

Figure 2:
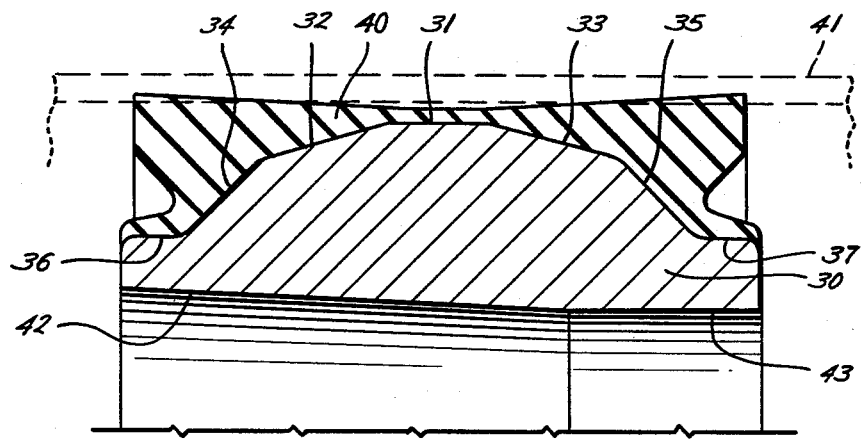

Consider first the construction shown in FIGURE 2 wherein the generally fusiform body 30 includes a cylindrical waist portion 31, two tapered portions 32 and 33 adjacent to the waist portion that are tapered similarly to portions 15 and 16 of the FIGURE 1 embodiment, and two more steeply tapered portions 34, 35 nearer the ends, with cylindrical necks 36, 37 at the extremities of the body 30. The seal sleeve 40 is shaped internally to be correlative to the outer surface of body 30, and is otherwise the same as seal sleeve 17 of the FIGURE 1 embodiment, being unitized with body 30 the same way sleeve 17 is unitized with body 12, and having the same interference and clearance with liner 41 as sleeve 17 has with liner 11. The interior surfaces 42, 43 of body 30 may be the same as or similar to those of body 12.

The taper angle of the less steeply tapered portions 32, 33 in the FIGURE 2 embodiment is preferably in the same range as that of the tapered portions 15, 16 in the FIGURE 1 embodiment. The taper angle of the more steeply tapered portions 34, 35 may be considerably larger depending on the relative diameters of liner and rod.

Figure 3:
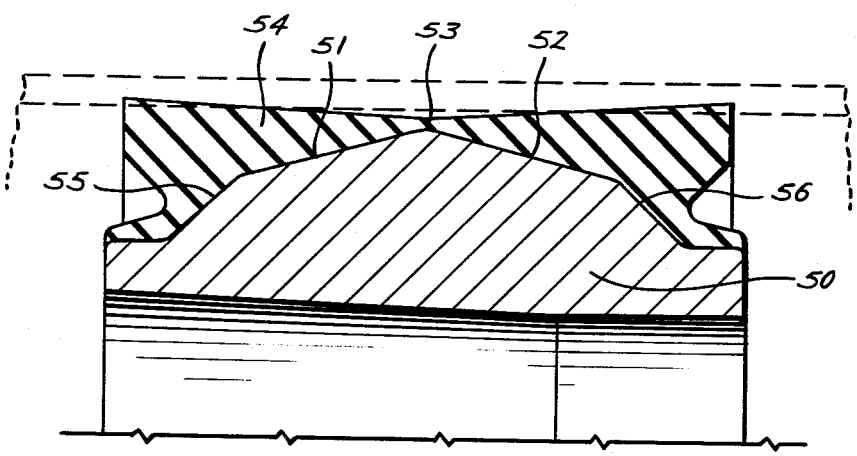

FIGURE 3 shows an embodiment the same as that of FIGURE 2 except that the body 50 has no central waist portion of cylindrical shape, the innermost tapered portions 51, 52 joining at an angle at 53. The inner surface of the seal ring 54 is correlative to the outer surface of body 50.

Figure 4:
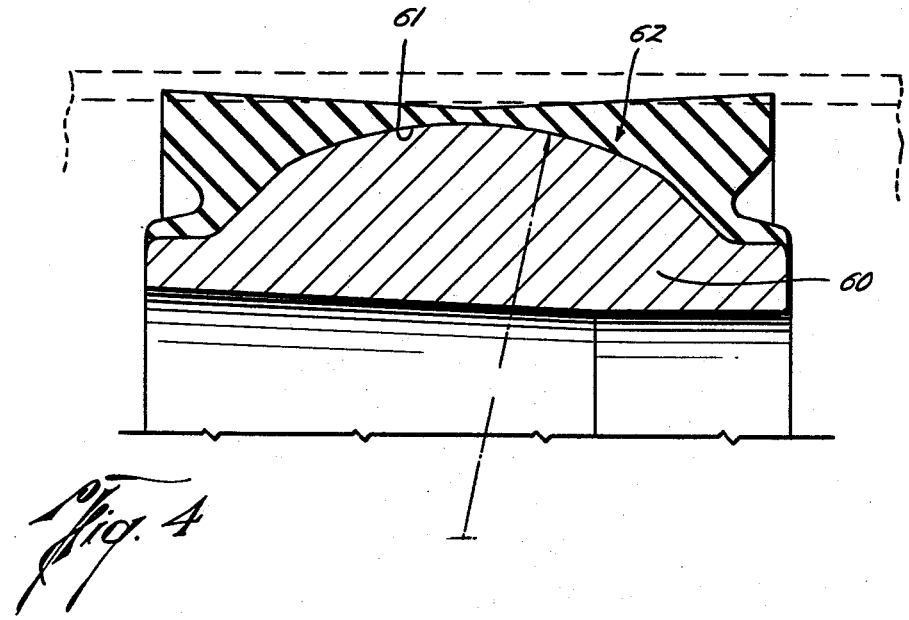

FIGURE 4 shows an embodiment the same as that of FIGURE 2 except that in place of the central cylindrical waist band portion 31 and the innermost conically tapered portions 32, 33 of the body 30 the body 60 has a spherically curved mid portion 61 and the interior surface of the seal sleeve 62 is correlative thereto.

Figure 5:
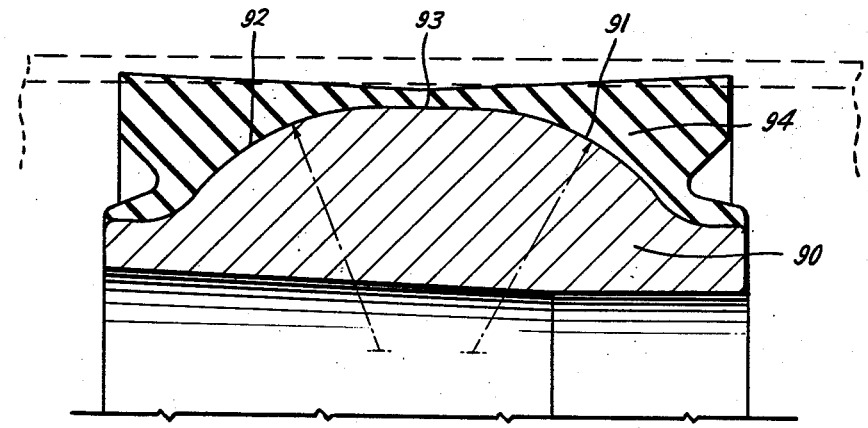

FIGURE 5 shows a construction the same as that of FIGURE 2 except that in place of the double tapered end portions including portions 32, 34 and 33, 35 of the FIGURE 2 embodiment, the body 90 substitutes two end portions 91, 92 having sperical surfaces, tangent to the adjacent central cylindrical waist band portion 93. The inner seurface of the seal sleeve 94 is correlative to the outer surface of the body 90.

Figure 6:
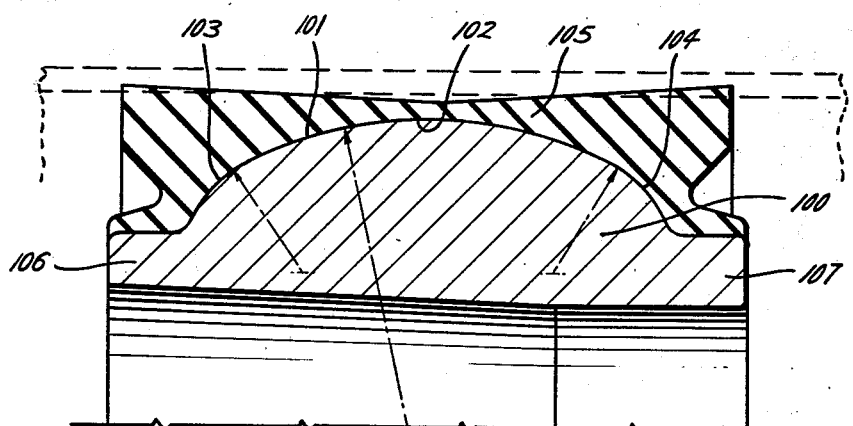

FIGURE 6 shows an embodiment the same as that of FIGURE 2 except that in place of the cylindrical and tapered portions 31, 32, 33, 34, 35 of FIGURE 2, the body 100 of FIGURE 6 has a portion 101 of generally ellipsoidal contour, e.g. as approximated in the usual way by a central spherical portion 102 of a larger radius and spherical end portions 103, 104 of smaller radius. The inner surface of the seal sleeve 105 is correlative to the outer surface of body 100.

It will be noted that in the FIGURE 6 embodiment, the surface of main body portion 101 between the cylindrical necks 106, 107 is of convex cross-section. To an approximation this is also true of the mid portions of the bodies of the pistons shown in FIGURES 1-5. While fusiform bodies having surfaces of concave cross-section are conceivable, it is preferred that the main body portions be of at least approximately convex cross-section, it being understood that a curved surface of convex cross-section may be approximated by a plurality of surfaces of straight line cross-sections. While an "approximately" convex surface could be formed from a plurality of individually concave surfaces, this would not be of any advantage and if the individual concavities were large their presence would be detrimental.

The theory of the fusiform body surface is the provision of a support for lip seals at each end and a wiast band at the middle, with such gradual changes of thickness as will prevent localized pressure concentrations at the outer surface of the rubber and stress concentrations within the rubber. To the degree that the surface at the main body portion is concave or untapered at each side of the waist thereof or incorporates quick large changes in direction it departs from the invention. Instead of mechanical interlock and full metal back-up, reliance for support of the seal sleeve is placed primarily on perfact unitization of the seal sleeve with the body and the elimination of stress concentrations.

Certain other factors involved in the body and seal sleeve construction of the invention and the effect of variation thereof on the results obtained will now be considered. These are the thickness "$t$" and length "$L$" (see FIGURE 1) of the central waist band portion of the seal sleeve, and the hardness of the rubber or other elastomer used for the seal sleeve.

The waist band is preferably thick enough and soft enough to absorb within its body abrasive particles of a size commonly encountered in large quantities in drilling mud, e.g. sand particles and small cuttings that pass the screen in the mud circulation system. This will minimize scoring of the liner by particles trapped between back-up member and liner.

On the other hand, the smaller the thickness of the portion of the seal sleeve of minimum thickness, and the harder (stronger) the elastomer, the greater the pressure for which the piston can be used. This may be viewed as being due to the fact that the portion of the seal sleeve of minimum thickness, not being backed up by metal, is under a shear stress. The greater the thickness of this portion, the greater the displacement between the inner and outer surfaces thereof. Since this displacement reverses when the piston travel direction reverses, the greater the thickness of this portion the greater the travel and consequent wear for any given pressure. Furthermore, the surface displacement at the waist band of the seal sleeve carries through to the lip portions of the sleeve and if excessive may tend to tear the lips at the juncture of the base of the triangular cross-section lip and the end of the metal body of the piston. For this reason also, the greater the thickness of the waist band section of the seal sleeve, the lower the pressure for which the piston can be used.

For any given piston body and liner, the thickness of the waist band of the seal sleeve will determine the clearance between liner and waist band. Since the elastomer band cushions the metal body of the piston against side thrusts toward the liner, the clearance between liner and waist band may be less than that between a bare metal piston and liner. The reduced clearance reduces the volume in which fluid may be trapped between the lips of the seal rings and through which fluid may flow when the lips are relaxed as at the end of a stroke. Both factors reduce the washing action on the seal ring and liner.

In addition to the hardness and the thickness of the seal sleeve at the portion of minimum thickness, another factor to be considered is the length of the portion of minimum thickness. In the embodiments of FIGURES 1, 2, and 5 (the drawings of all figures being approximately to scale and full size) the lengths of the central waist band portions of the seal sleeve and metal body is about three-quarters of an inch. In the embodiments of FIGURES 3, 4, and 6, although the length of the portion of absolute minimum thickness actually approaches zero, the adjacent portions of relatively small thickness compared to the rest of the seal ring is substantial, due to the large radius of curvature of the central portion of FIGURES 4 and 6 and the moderate taper angle of the inner cones 51, 52 of FIGURE 3 compared to the taper angle outer cones 55, 56. The length of such relatively thin portions whose thickness does not exceed the preferred three-eighths inch limit mentioned previously will be of the same order of magnitude as the length of the portions of minimum thickness in FIGURES 3, 4 and 6. Preferably the length of such thin portion will be at least three times the average thickness thereof.

The greater the length of the portion of minimum thickness or comparable relatively thin portion, the greater the pressure for which the piston can be used, for in this portion there is no back-up of the rubber and it must resist pressure by its shear strength. The greater the length of this portion, the greater the area that is placed in shear and hence the lower the unit shear stress.

Two other factors involved in the construction of the subject piston need to be mentioned, having to do with the length and thickness of the waist band portion of the seal sleeve. The thickness of the waist band portion of the seal sleeve should be as large as possible, consistent with other factors, so that its curing time will not be too different from that of the thicker lip portions of the seal sleeve. Otherwise, the waist band may become over cured if the piston is left in the mold long enough to cure the lips.

The length of the waist band should be great enough to keep the side thrust loading thereof below the level that would be destructive of the elastomer, for it is at the waist band that side thrust loads will be concentrated. This latter factor indicates that a cylindrical waist portion for the metal body, as in FIGURE 1, is generally preferable to that of FIGURE 3. There may of course be other factors involved such that a balanced double tapered waist as in FIGURE 3 would be desired.

If the length of the waist band portion of the seal sleeve is great enough for any given thickness thereof, there will be no displacement beyond the central portion thereof under pressure load from either end, so that there will be no stress reversals in the seal sleeve, thereby prolonging its life. This is another factor influencing the selection of the length to thickness ratio. In the preferred embodiment of FIGURE 1, where the length is ¾ inch and the thickness ³⁄₃₂ inch, the length thickness ratio is 8.

While a preferred embodiment of the invention and several modifications thereof have been shown and described, further modifications can be made by one skilled in the art without departing from the spirit of the invention.

Comparing the constructions of FIGURES 2-6 with that of FIGURE 1, it is to be noted that in the latter embodiments there is less tendency for the lips of the seal sleeve to pull inwardly away from the liner when the seal sleeve is compressed in the liner. When the seal sleeve is compressed in the liner the resultant rubber flow lengthens the outer surface of the seal sleeve, while the length of the inner surface of the sleeve does not change, being unitized with the metal body. When the length of the outer surface increases while the length of the inner surface remains unchanged, the end faces of the seal sleeve are placed in tension, resulting in the tendency for the lips to be drawn inwardly. If there is more rubber between lips and body, as in the FIGURE 2-6 embodiments, due to the greater taper of the body near the ends of the body, the unit stress in the end faces of the seal sleeve will be reduced and the lips will remain in pressure contact with the liner. This is an advantage of the variable taper embodiment of FIGURES 2-6.

What is claimed is:

1. An expansible chamber comprising a liner and a piston movable therein, said piston including a metal body having an outer surface of fusiform shape and an elastomer double lip seal sleeve around said body extending from adjacent one end of said body to adjacent the other end thereof and having an inner surface correlative to that of said outer surface of the metal body and unitized therewith, said seal sleeve including a band around the waist of the metal body which band has a thickness in the range of ¹⁄₃₂ to ⅜ inch, said band being the portion of the sleeve of minimum thickness, said sleeve having a Shore durometer (type A) hardness in the range 60 to 95, said sleeve being cemented to said body and molded and vulcanized in place, the said outer surface of the fusiform shaped metal body including portions of differing taper, the cross section of the outer surface of the metal body being at least approximately convex from adjacent said one end thereof to adjacent said other end thereof, the cross-sectional internal angle between adjacent portions of said outer surface of the body of differing tapers being obtuse, said portion of the body whose surface is at least approximately convex in cross-section including portions adjacent each side of said band having a taper angle lying in the range of five to fifteen degrees and portions adjacent the ends of the piston body having a taper angle greater than that of the portions adjacent said band, there being cylindrical necks at each end of said body.

2. Combination of claim 1 wherein there is a radial clearance of the order of 0.002 to 0.010 inch between said liner and said band and the lip at each end of the seal sleeve makes an interference fit with the liner and is formed by an annular channel in the end of the seal sleeve between the lip and an inner portion of the seal sleeve unitized to said body.

3. A piston including
   a metal body having an outer peripheral surface of substantially smooth fusiform shape, and
   a substantially metal-free elastomer double lip seal sleeve having a generally cylindrical outer peripheral surface, said sleeve being disposed coaxially around said body and extending from adjacent one end of the body to adjacent the other end thereof, the hardness of said sleeve as measured on the Shore type A durometer being throughout in the range of 60-95 from one end of the sleeve to the other, said sleeve having an inner surface correlative to that of the metal body and unitized therewith,
   the portion of said fusiform body where the outer surface is of maximum diameter and the areas immediately adjacent thereto forming a waist portion, the portion of said seal sleeve between said waist portion of the body and said outer peripheral surface of the sleeve forming a thin band whose thickness is in the range of ¹⁄₃₂ to ⅜ inch.

4. Combination according to claim 3 wherein said band has a length at least three times the average thickness thereof and the taper angle of portions of the body immediately adjacent said band are in the range of five to forty-five degrees.

5. Combination of claim 3 wherein said seal sleeve is made of oil resistant synthetic rubber pressure-temperature unitized to said metal body.

6. A piston including
   a metal body having an outer peripheral surface of substantially smooth fusiform shape, and
   a substantially metal-free elastomer double lip seal sleeve having a generally cylindrical outer peripheral surface, said sleeve being disposed coaxially around said body and extending from adjacent one end of the body to adjacent the other end thereof, the hardness of said sleeve as measured on the Shore type A durometer being throughout in the range of 60-95 from one end of the sleeve to the other, said sleeve having an inner surface correlative to that of the metal body and unitized therewith,
   the portion of said fusiform body where the outer surface is of maximum diameter and the areas immediately adjacent thereto forming a waist portion, the portion of said seal sleeve between said waist portion of the body and said outer peripheral surface of the sleeve forming a thin band whose thickness is in the range of ¹⁄₃₂ to ⅜ inch,
   said outer peripheral surface of the seal sleeve at each of the portions thereof adjacent said band flaring slightly progressing from immediately adjacent said band all the way to the ends of the sleeve,
   said outer peripheral surface of said fusiform shaped body having a varying taper, the taper angle of portions of said surface immediately adjacent the waist of the body at each side thereof being less than the taper angle of portions of said surface farther from said waist.

7. Combination according to claim 6 wherein said outer peripheral surface of said fusiform shaped body including said waist portion and said portions immediately adjacent said waist at each side thereof and said portions farther from said waist are of continuously varying taper, the taper angle increasing from zero progressing from the middle of the waist portion toward the ends of the body, whereby axial sections of said outer peripheral surface of said fusiform shaped body are convexly curved.

8. Combination of claim 7 including cylindrical necks at each end of said body adjacent said portions of continuously varying taper, said sleeve extending beyond said portions of the body of continuously varying taper and overlying said cylindrical necks at each end thereof, said seal sleeve including tubular portions at the extremities thereof which are of less radial thickness than the radial distance from the outer periphery of said necks to the outer periphery of the sleeve.

References Cited by the Examiner
UNITED STATES PATENTS

| | | | |
|---|---|---|---|
| 1,718,474 | 6/29 | McQuaid | 92—243 |
| 2,295,678 | 9/42 | Miller | 92—254 |
| 2,676,075 | 4/54 | Stone | 92—254 |

KARL J. ALBRECHT, *Acting Primary Examiner.*